March 11, 1924.  1,486,649

H. EWERT

COFFEE PERCOLATOR

Filed Jan. 31, 1923

INVENTOR.
HENRY EWERT.
R. W. Smith
ATTORNEY.

Patented Mar. 11, 1924.

1,486,649

UNITED STATES PATENT OFFICE.

HENRY EWERT, OF LOS ANGELES, CALIFORNIA.

COFFEE PERCOLATOR.

Application filed January 31, 1923. Serial No. 616,050.

*To all whom it may concern:*

Be it known that I, HENRY EWERT, a citizen of the United States, residing at Los Angeles, county of Los Angeles, State of California, have invented new and useful Improvements in Coffee Percolators, of which the following is a specification.

This invention is a percolator for coffee and the like, and has for its object the provision of a container for the dry coffee, adapted to be lowered into, and raised from the water in a percolating receptacle, for percolation of the water through the coffee.

It is a further object of the invention to provide for heating the water, and gravity flow thereof into the percolating receptacle, with controlling means for said flow.

It is a still further object of the invention to provide means for raising and lowering the coffee container, said means having an automatic control for stopping the same after predetermined operation.

Further objects of the invention will be readily understood from the following description of the accompanying drawings, in which.

Figure 1:
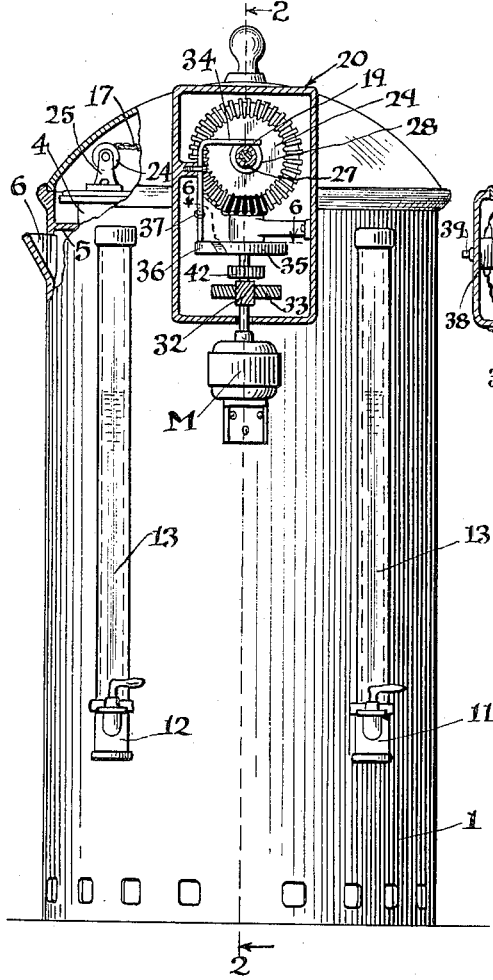
Fig. 1 is a front elevation of the percolator, partly broken away.
Figure 2:
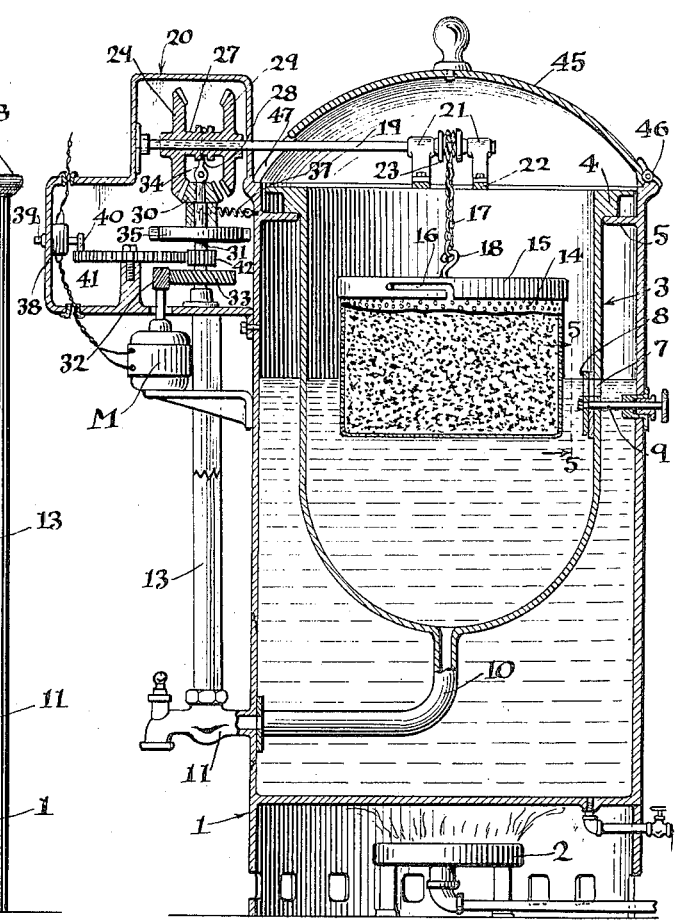
Fig. 2 is a vertical section on the line 2—2 of Fig. 1.
Figure 4:
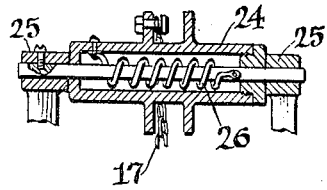
Fig. 4 is a detail section on the line 4—4 of Fig. 3.
Figure 5:
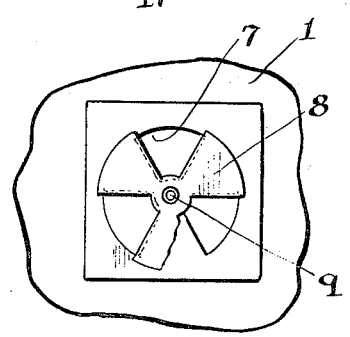
Fig. 5 is a detail section on the line 5—5 of Fig. 2.
Figures 3, 6:
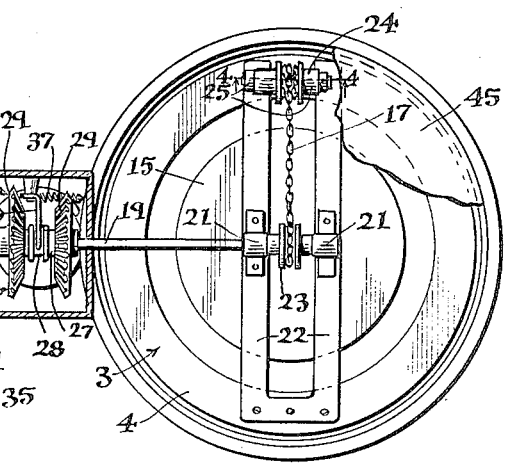
Fig. 3 is a top view of the percolator, partly broken away.
Fig. 6 is a detail section on the line 6—6 of Fig. 1.

The percolator may be constructed with a usual outer chamber 1 adapted to hold water, and having a burner 2 beneath the same. A usual percolating receptacle 3, which may be a stone jar, is supported in chamber 1, as by resting the rim 4 of said receptacle upon a flange 5 at the top of chamber 1.

The bottom of the percolating receptacle is spaced from the base of chamber 1, and said receptacle and chamber are arranged so as to provide an annular space between the same. The water chamber is adapted to be filled to the top of said annular space, through a usual intake 6 in the wall of chamber 1 at the top thereof.

A port 7 is provided in the side of the percolating receptacle, above the bottom of said receptacle, and in spaced relation from the top of the percolator, the parts being so arranged that the water in the upper portion of the annular space surrounding receptacle 3, which will flow by gravity through port 7 into the said receptacle, will fill the latter to a point constituting the coffee capacity of the percolator, and which is below the level of said port.

Means are provided for shutting-off and opening port 7, and for this purpose said port may comprise a plurality of circumferentially spaced apertures, and a valve disc 8 may be mounted on a stem 9 operable from the outside of chamber 1, the parts being so arranged that by turning the stem, the valve disc is rotated to move a plurality of corresponding apertures formed therein, into or out of alinement with the apertures of port 7.

The bottom of receptacle 3 communicates with a coffee discharge conduit 10, extending to the outside of the percolator, where it is connected to a usual faucet 11. A similar faucet 12 upon the outside of the percolator, is adapted for withdrawing water from the lower portion of chamber 1. Usual gauge glasses 13 communicate with the respective faucets, and are mounted upon the front of the percolator.

A container for dry coffee is adapted to be raised and lowered in receptacle 3, so as to alternately submerge said container in the coffee water in the lower portion of the percolating receptacle, and elevate said container above the coffee water, for percolation of the water through the coffee.

As an instance of this arrangement, the coffee container is shown as a perforated receptacle 14, having a perforated cover 15, adapted to be fixed upon the container by a bayonet slot connection 16.

A sprocket chain 17 is connected to a swivel hook 18 on the top of cover 15, and said chain is raised and lowered by a drive mechanism actuated by an electric motor M, mounted on the front of the percolator.

The drive mechanism comprises a shaft 19 extending across the top of the percolator, with its outer end journaled in a housing 20 upon the front of the percolator, and its inner end journaled in bearings 21, carried by a bracket 22 extending across the top of the percolator.

Chain 17 extends over a sprocket wheel 23 upon shaft 19, with the end of said chain preferably fixed to a drum 24 journaled in bearings 25 upon the end of bracket 22. The drum is preferably spring rotated, as by the coil spring 26, the parts being arranged to permit the chain to unwind from the drum, against the tension of the spring, as the chain and the coffee container are lowered by rotation of the sprocket wheel in one direction, with the slack of the chain being wound on the drum, as the sprocket wheel turns in the opposite direction to elevate the coffee container.

The mechanism for turning shaft 19 and sprocket wheel 23 in opposite directions, is arranged as follows:

A hub 27 is keyed upon shaft 19, within housing 20, and is provided with a groove 28 adapted to receive an actuating lever. Bevel gears 29 are fixed upon the respective ends of the hub, with a bevel pinion 30 between the same, and adapted to mesh with one or the other of the gears, as hub 27 is shifted, for rotating the hub and shaft 19, in one direction or the other.

The bevel pinion is mounted on a shaft 31 journaled in housing 20, and is rotated by motor M through a gear 32 upon the motor shaft, meshing with a gear 33 upon shaft 31.

At each rotation of bevel pinion 30, the hub 27 is shifted in opposite directions, to reverse the rotation of shaft 19 and thereby raise and lower the coffee container 14. As an instance of this arrangement, a lever 34 is fulcrumed on housing 20, with one end of the lever forming an arm received in groove 28 of the hub 27, and the other end of the lever lying in the path of a cam disc 35 rotatably fixed upon shaft 31. A cam 36 upon said disc is so positioned as to engage the lever, during rotation of the disc, and swing said lever in one direction. The cam will retain the lever in said position during one-half of the rotation of disc 35, and as said cam moves beyond the lever, the latter is released, and swung in the opposite direction by a spring 37. The lever is retained in this latter position by the spring, during the second half of the rotation of disc 35, or until cam 36 again engages the lever.

The shifting of the lever in opposite directions as thus described, causes the arm of the lever which is received in groove 28, to shift hub 27 in opposite directions on shaft 19, and thereby alternately engage the bevel gears 29 with pinion 30, for reversing the direction of rotation of the shaft.

The motor M is preferably controlled by a switch 38 mounted on housing 20. The switch is manually operated to close the electrical circuit and start the motor, and automatic means are preferably provided for actuating said switch so as to break the circuit and stop the motor, after predetermined reciprocation of the coffee container 14.

As an instance of this arrangement, the switch may include a push rod 39 shiftable in opposite directions to make and break the electrical circuit. The rod has one end projecting outwardly beyond housing 20, so that the rod may be manually shifted inwardly for closing the circuit, and at a predetermined interval after said movement of the push rod, its inner end is adapted to be engaged by a finger 40, for shifting the rod in the opposite direction and breaking the circuit.

The finger 40 is carried by a gear 41 which meshes with a pinion 42 fixed upon shaft 31, the parts being so arranged, that after the switch has been manually closed to start the motor, shaft 31 will make a desired number of revolutions, to cause desired reciprocation of coffee container 14, before gear 41 makes one complete revolution, to cause finger 40 to engage push rod 39, and break the electrical circuit for stopping the motor.

A cover 45 may be provided for the percolator as thus described, said cover being hinged at 46 to the outer shell of the percolator, and adapted to swing downwardly to closed position with shaft 19 extending through a slot 47 provided in said cover. By this arrangement, the entire operating mechanism of the percolator is enclosed, and upon swinging cover 45 to open position, the coffee container 14 is readily accessible.

In operation, dry coffee is placed in container 14, and the water chamber 1 is filled, valve 8 being closed. The valve is then opened, to permit the water above port 7 to flow by gravity into the percolating receptacle. The valve is then again closed, and push rod 39 of the switch is manually shifted to start the motor, and cause reverse rotation of shaft 19, as previously described. Sprocket chain 17 will thus be raised and lowered, for alternately raising the coffee container above the coffee water and submerging said container in the water, in order that the water may percolate through the coffee. After predetermined reciprocation of the coffee container, the push rod of the switch is automatically shifted to break the circuit and stop the motor, as hereinbefore set forth.

It will be understood that during the coffee making, the liquid is heated by burner 2, and that hot water may be withdrawn through faucet 12, while the liquid coffee which is made, is withdrawn through faucet 11.

It will be apparent that various changes may be made in the construction, combination, and arrangement of parts as thus described, without departing from the spirit of the invention.

What is claimed is:

1. A percolator including a percolating receptacle and a liquid chamber surrounding the same and communicating with said receptacle and arranged for gravity flow of liquid from said chamber to said receptacle.

2. A percolator including a percolating receptacle adapted to receive a liquid, a movable container adapted to hold material for percolation of liquid therethrough, and drive mechanism having means for periodically reversing the same to lower and raise said container into and out of the liquid in said receptacle.

3. A percolator including a percolating receptacle, a liquid chamber communicating with said receptacle and arranged for gravity flow of liquid from said chamber to said receptacle, a container adapted to hold material for percolation of liquid therethrough, and means for lowering and raising said container into and out of the liquid in said receptacle.

4. A percolator including a percolating receptacle, a liquid chamber surrounding the same and opening into said receptacle and arranged for gravity flow of liquid from said chamber to said receptacle, and means for closing said opening.

5. A percolator including a percolating receptacle adapted to receive a liquid, means for controlling the flow of liquid to said receptacle, a container adapted to hold material for percolation of liquid therethrough, and means for lowering and raising said container into and out of the liquid in said receptacle.

6. A percolator including a percolating receptacle, a liquid chamber opening into said receptacle and arranged for gravity flow of liquid from said chamber to said receptacle, means for closing said opening, a container adapted to hold material for percolation of liquid therethrough, and means for lowering and raising said container into and out of the liquid in said receptacle.

7. A percolator including a percolating receptacle adapted to receive a liquid, a container adapted to hold material for percolation of liquid therethrough, drive mechanism adapted to lower and raise said container into and out of the liquid in said receptacle, controlling means for said drive mechanism, and means for actuating said controlling means to stop said drive mechanism after predetermined reciprocation of said container.

8. A percolator including a percolating receptacle adapted to receive a liquid, a container adapted to hold material for percolation of liquid therethrough, drive mechanism adapted to lower and raise said container into and out of the liquid in said receptacle, and an automatic control for said drive mechanism adapted to stop the latter after predetermined reciprocation of said container.

9. A percolator including a percolating receptacle, a liquid chamber communicating with said receptacle and arranged for gravity flow of liquid from said chamber to said receptacle, a container adapted to hold material for percolation of liquid therethrough, drive mechanism adapted to lower and raise said container into and out of the liquid in said receptacle, and an automatic control for said drive mechanism adapted to stop the latter after predetermined reciprocation of said container.

10. A percolator including a percolating receptacle, a liquid chamber opening into said receptacle and arranged for gravity flow of liquid from said chamber to said receptacle, means for closing said opening, a container adapted to hold material for percolation of liquid therethrough, drive mechanism adapted to lower and raise said container into and out of the liquid in said receptacle, and an automatic control for said drive mechanism adapted to stop the latter after predetermined reciprocation of said container.

In testimony whereof I have signed my name to this specification.

HENRY EWERT.